(12) United States Patent
Douglas

(10) Patent No.: US 6,350,383 B1
(45) Date of Patent: Feb. 26, 2002

(54) REMEDIATION MATERIAL AND REMEDIATION PROCESS FOR SEDIMENTS

(75) Inventor: Grant Brian Douglas, Parkerville (AU)

(73) Assignee: Commonwealth Scientific and Industrial Research Organisation, Austrialian Capitol Terriroty (AU)

(*) Notice: Subject to any disclaimer, the term of this patent is extended or adjusted under 35 U.S.C. 154(b) by 0 days.

(21) Appl. No.: 09/381,383

(22) PCT Filed: Dec. 30, 1997

(86) PCT No.: PCT/AU97/00892

§ 371 Date: Nov. 2, 1999

§ 102(e) Date: Nov. 2, 1999

(87) PCT Pub. No.: WO98/42626

PCT Pub. Date: Oct. 1, 1998

(30) Foreign Application Priority Data

Mar. 26, 1997 (AU) .......................................... PO-5896

(51) Int. Cl.$^7$ ................................................. C02F 1/42
(52) U.S. Cl. ...................... 210/679; 210/683; 210/747; 210/906; 210/911; 210/912; 210/913; 210/688; 405/128.5; 405/129.25; 502/65; 502/73; 502/81; 502/84
(58) Field of Search ............................... 210/665, 666, 210/667, 679, 683, 688, 714, 717, 727, 728, 747, 906, 911–914; 405/128, 129, 128.5, 129.25; 252/175, 176, 179, 181; 502/65, 73, 80, 81, 84

(56) References Cited

U.S. PATENT DOCUMENTS

| | | | |
|---|---|---|---|
| 3,575,852 A | * 4/1971 | Hughes | 252/175 |
| 3,617,569 A | 11/1971 | Daniels | 210/727 |
| 3,692,671 A | 9/1972 | Recht | 162/29 |
| 3,956,118 A | 5/1976 | Keber et al. | 210/716 |
| 4,507,206 A | 3/1985 | Hughes | 210/709 |
| 4,543,013 A | * 9/1985 | Wagner et al. | 405/128 |
| 4,701,431 A | * 10/1987 | Pine | 502/73 |
| 4,935,395 A | * 6/1990 | Schwetje et al. | 502/65 |
| 5,039,427 A | 8/1991 | Conover | 210/702 |
| 5,071,587 A | * 12/1991 | Perman | 252/181 |
| 5,132,021 A | * 7/1992 | Alexander | 210/679 |
| 5,236,879 A | * 8/1993 | Inoue et al. | 502/73 |
| 5,457,272 A | 10/1995 | Hooykaas | 588/250 |
| 5,464,467 A | * 11/1995 | Fitch et al. | 95/98 |
| 5,603,838 A | * 2/1997 | Misra et al. | 210/665 |
| 5,616,170 A | * 4/1997 | Ojo et al. | 95/101 |
| 5,683,953 A | 11/1997 | Mills | 502/405 |
| 5,917,069 A | * 6/1999 | Buckl et al. | 554/193 |
| 6,136,199 A | * 10/2000 | Sen Gupta et al. | 210/670 |

FOREIGN PATENT DOCUMENTS

| | | |
|---|---|---|
| EP | 191 893 | 8/1986 |
| EP | 626 346 | 11/1994 |
| JP | 4-215900 | 8/1992 |
| JP | 06-218 365 | 8/1994 |

OTHER PUBLICATIONS

Water Environment Research vol. 68 No. 3 May/Jun. 1996; pp. 295–300; "Adsorption of Fluoride, Phosphate, and Arsenate Ions Lanthanum—Impregnated Silica Gel"; Wasay et al.

Wat. Sci. Tech. vol. 35, No. 7, 1997, pp. 71–78, Removal of Arsenic (v) Ion From Aqueous Solutions by Lanthanum Compounds, Tokunaga et al.

Proc. Rare Earth Res. Conf. 11th, vol. 1, 1974, pp. 4–13, "Lanthanum Precipitation: An Alternative Method for Removing Phosphates From Wastewater", Melnyk et al.

Advances in Water Pollution Research, 5th Int'l Conference, 1970, vol. 1, pp. I–17/1–14, "Precipitation of Phosphates from Water and Wastewater using Lanthanum Salts", Recht et al.

J. Inorg. Nucl. Chem., vol. 30, 1968, pp. 1585–1593, "The Reactions of Lanthanum with the Straight Chain Polyphosphates", McNabb et al.

Wat. Res. vol. 31, No. 7, 1997, pp. 1733–1737, "Removal of Lanthanum from Aqueous Solutions by Natural Bentonite", Chegrouche et al.

Plant and Soil 155/156, 1993, pp. 251–254, 1993, "Use of Geochem—PC to Predict Rare Earth Element (RRE) Species in Nutrient Solutions", Diatloff et al.

Geochimica et Cosmochemica Acta vol. 60, No. 17, 1996, pp. 3341–3346, "The Influence of Phosphate Coprecipitation on Rare Earth Distributions in Natural Waters", Byrne et al.

Proceedings of Symposium on Nutrients in Natural Waters, 161st National American Chemical Society Meeting, Los Angeles, 1971, "Nutrient Removal from Wastewater by Physical —Chemical Processes", Cohen.

Journal WPCF, vol. 48, No. 5, May 1976, pp. 817–831, "Laboratory Evaluation of Nutrient Inactivation Compounds for Lake Restoration", Peterson et al.

EPA–660/3–74–032, Oct. 1974, "Nutrient Inactivation as a Lake Restoration Procedure", Peterson et al.

International Search Report for PCT/AU97/00892.

\* cited by examiner

*Primary Examiner*—Peter A. Hruskoci
(74) *Attorney, Agent, or Firm*—Merchant & Gould P.C.

(57) ABSTRACT

A material and method for removal of environmental oxyanions (and especially phosphates), the material comprising a substrate such as a clay modified with complexing elements selected from Group IIIB, Group IVB, and lanthanide elements (or a mixture of such elements). The resultant modified substrate can bind oxyanions and make them unavailable for utilisation in the environment; in the case of phosphates, by algae and the like. The method includes forming a capping of material at the sediment/water interface, applying the material in the form of pellets at the sediment/water interface, or injecting the pellets into the sediment.

23 Claims, No Drawings

REMEDIATION MATERIAL AND REMEDIATION PROCESS FOR SEDIMENTS

The present invention relates to a sediment remediation process, together with a material for use in a sediment remediation process.

BACKGROUND OF THE INVENTION

The progressive eutrophication of estuarine and freshwater systems throughout Australia and overseas is often reflected in an increase in both phytoplankton bloom frequency and biomass, often with a shift to more nuisance species such as cyanobacteria. A significant proportion of the research into, and management of, estuarine and freshwater systems has focussed (with varying success) on reducing inputs of nutrients (in particular phosphorus) from the catchment.

However, the present invention has recognised that increased internal loadings derived from sedimentary nutrient stores accumulated over years to decades, constitute a major barrier to the effective management and restoration of estuarine and freshwater systems. Indeed, it is now apparent that if effective sediment-nutrient management strategies can be identified and adopted to modify internal nutrient (phosphorus) loadings, this will equip natural resource managers with a powerful tool for both short- and long-term estuarine and freshwater system management.

SUMMARY OF THE INVENTION

An aim of the present invention is to provide a sediment remediation process and a sediment remediation material which will assist in modifying, and in particular reducing, internal recycling sediment nutrient stores in estuarine and freshwater systems.

Broadly, the invention provides a method for remediating matter by removing oxyanion or phosphorus containing pollutants therefrom, the method comprising the step of contacting the matter with a substrate doped, cation-exchanged, or modified with, or otherwise having adsorbed complexing element(s) selected from Group IIIB and Group IVB elements.

The mechanism for reactions which occur in the substrate on addition of the complexing elements, and the chemical speciation of these elements are presently not well understood. By the term "modified" which term will be used hereafter, it is intended to cover whatever the reaction mechanism may be, which includes modification of the substrate by doping and/or cation exchange, and/or adsorption of the complexing element by the substrate. In addition, by the term "complexing element(s)", ionic moieties containing such complexing elements are included, in addition to complexing element(s) alone.

Typical matter may comprise sediments in waterways and catchments, effluent from sewage treatment plants (commercial and/or domestic), industry, aquaculture (commercial and/or domestic and/or agricultural), sediments in water supply impoundments (lakes, reservoirs), sediments in constructed wetlands and stormwater detention basins or similar engineered or natural impoundments.

Typical pollutants envisaged include phosphorus containing compounds, anions generally which are capable of forming complexes, and in particular oxyanions such as in particular phosphates, but also arsenate, vanadate, chromate and selenate, tungstate, niobate, tantalate, and tellurate, amongst others, and peroxyanions inter-alia such as persulphate. It is also expected that the method may have application in removing pollutants such as organic chemical contaminants such as pesticides or herbicides or trace elements, although this is not the primary objective of the invention.

Generally, phosphorus will be removed as dissolved phosphates or orthophosphate. Phosphates exist as different species, depending upon pH and other solution physico-chemical parameters. Phosphorus is often present in polluted aqueous environments in insoluble forms, and is transformed to soluble phosphate species by various processes that can occur within the environment. Examples of insoluble phosphorus include organically-bound phosphate which may become aqueously soluble due to biogeochemical processes, or phosphorus held in inorganic forms such as in mineral form as in mineral apatite or fertilizer, or that bound to crystalline and/or amorphous Fe-Mn-oxyhydroxide species all of which may be released due to various biogeochemical processes.

The method may include in addition, adding a water soluble salt of the complexing element selected from Group IIIB and Group IVB elements, along with the modified substrate. This would be expected to give rise to an immediate reduction in pollutant levels due to formation of complexes with the soluble salt, leaving the remediation material for more long term reduction in pollutants.

Preferably the salt is a chloride salt or a nitrate salt or a mixture of chloride and nitrate salts of the complexing element.

The present invention also provides a remediation material for use in reducing oxyanion or phosphorus pollutant loadings in matter, the remediation material comprising a substrate doped, cation-exchanged or modified with, or having adsorbed a complexing element(s) selected from the Group IIIB and Group IVB elements.

The substrate may be any suitable substrate having a moderate to high cation exchange capacity (CEC)—a substrate having a CEC of greater than about 30 milliequivalents per 100 grams (meq/100 g) having a 'moderate' CEC, while a 'high' CEC substrate may have a CEC of greater than about 100 meq/100 g and commonly about 150meq/100 g or greater.

It is preferred that the substrate is a mineral substrate due to these being in many instances relatively inert and/or harmonious in the environment.

In the most preferred form of the invention, the mineral substrate is an expandable clay such as saponite, bentonite or vermiculite. These materials are regarded as expandable clays due to their ability to absorb waters of hydration into their internal structure which may change the basal (d-) spacing.

Alternatively, the mineral substrate may be a fibrous, chain-like related clay mineral such as attapulgite, sepiolite, or palygorsite.

However, it will be appreciated that materials of a similar nature to clays, clay-like minerals, or expandable clays, may also be satisfactory. These may include materials both natural or synthetic. For instance, zeolites have also been investigated for use as the mineral substrate of the invention, both naturally occurring zeolites and artificially synthesised zeolites. Zeolites are also commonly a moderate to high cation exchange capacity material and although they are aluminosilicate minerals like clays, they have a different three dimensional framework structure with internal cavities.

The mineral substrate of the invention preferably has a high CEC in order to allow it to be modified to increase its pollutant or nutrient binding capacity, and in particular its phosphorous binding/absorbing/complexing capacity. Specifically, this involves the exchange of cations present in the mineral substrate with the nutrient complexing element or elements referred to above. This modification may be described as doping or cation exchange/ion exchange.

The mineral substrate may be pre-treated with a concentrated acid (e.g. HCl, $H_2SO_4$) to remove a large proportion of the interlayer and/or structural cations, before being treated with the complexing element. The pretreatment of clays with acid represents another pathway to prepare modified clays for phosphate adsorption. A potential advantage of this technique is that there may be a degree of modification to the underlying clay structure which enhances the uptake of the complexing element or other structural changes to the clay. These structural changes may make the clay more amenable to other modification steps which may improve the phosphate uptake capacity.

The complexing element is preferably an element capable of forming a complex with oxyanions. Most preferably the complexing element is capable of forming a complex with phosphorus containing compounds, as phosphorus is often the most common nutrient present in contaminated aquatic systems which may mean there is a high potential for algal bloom growth. Typically, the phosphorus will be present as phosphate anions in such aquatic systems.

The remediation material may be applied as a dry powder, as pellets, or as a wet slurry to the surface of a waterbody, or directly to the surface of bottom sediments, or injected into the bottom sediments. It is advantageous to form a capping layer of remediation material to the surface of bottom sediments, water conditions such as flow rates and turbulence permitting. The capping layer may be of any thickness, but a range between 0.5 mm and 5 mm should prove suitable, with an optimum range between 2 mm and 3 mm begin suitable for most conditions, without giving rise to undesirable side effects to the existing ecosystems. The layer thickness required will depend on factors such as rate, duration, and variability of phosphorus release, the rate and/or capacity of adsorption/binding/complexation of the remediation material, the desired phosphorus reduction and the influence of any other environmental and/or physico-chemical conditions.

The remediation material may be sandwiched between geotextiles such as water permeable membranes or woven plastic cloth such as woven PVC (poly vinyl chloride) cloth. In the case of pelletised remediation material, a weave net having apertures smaller than the pellets may be used to sandwich the pellets, in order to accommodate a high solute flow while minimising loss of the remediation material.

The remediation material is believed to be particularly suitable for reducing internal phosphorus loadings in bottom sediments in estuarine or freshwater systems.

The element is preferably selected from the Group IIIB and IVB elements from the Periodic Table (CAS version). The Group IIIB elements comprise scandium, yttrium, lanthanum, and actinium, and for the purposes of this specification are deemed to include lanthanides. The Group IVB elements comprise titanium, zirconium, and hafnium. The lanthanides comprise lanthanum, cerium, praseodymium, neodymium, promethium, samarium, europium, gadolinium, terbium, dysprosium, holmium, erbium, thullium, ytterbium, and lutetium. A mixture of such elements may be used.

In particular, the element is most preferably selected from the group comprising lanthanum (La), cerium (Ce), praseodymium (Pr), neodymium (Nd), samarium (Sm), europium (Eu) and yttrium (Y) or the group comprising zirconium (Zr) and hafnium (Hf), with lanthanum being the element of choice. As discussed above, it will also be appreciated that some of the remaining elements referred to above will not be preferred due to toxicity problems. The most preferred elements are selected from Group IIIB, Group IVB, and lanthanides, and have an atomic number between 21 and 72 inclusive.

With particular reference to the use of lanthanum, it has been demonstrated that lanthanum forms an extremely stable, redox-insensitive complex with phosphorous under most common environmental conditions, making the phosphorous unavailable to phytoplankton in aquatic systems and thus, potentially reducing the magnitude and/or frequency of algal blooms. With the lanthanum bound in the substrate, the lanthanum phosphate complex is effectively immobilised. In addition zirconium also forms a useful cation-exchanged modified substrate. It is believed that a mixture of cations comprising lanthanum and/or zirconium, optionally with other rare earth elements may be used in the modified substrates.

The sediment remediation material of the present invention may be used as a reactive capping or layer on top of bottom sediments in estuarine or freshwater systems. Due to the high nutrient binding capacity of the sediment remediation material (and in the preferred form its phosphorus binding capacity), the layer of material binds and substantially reduces the availability of the internal store of nutrients in the sediment, thus reducing the waterway nutrient loading.

Thus, the present invention additionally provides a sediment remediation process, the process comprising placing a reactive capping or layer of a sediment remediation material on top of bottom sediments in estuarine or freshwater systems, the sediment remediation material comprising a mineral substrate doped, cation-exchanged, or modified with, or having adsorbed a nutrient complexing element(s) selected from the Group IIIB and Group IVB elements.

The sediment remediation material may also be altered by the addition of organic and/or inorganic ligands to the clay and/or to the interlayer ions thereof, to alter its chemical properties for a particular application. This can form complexes with the exchanged cation in the substrate, resulting in the modified behavior in the sediment remediation material.

The placement of the reactive capping or layer may be achieved using known equipment and apparatus. However, the form of the sediment remediation material may be physically and/or chemically altered to suit a particular application. For example, where the mineral substrate is an expandable clay, the clay may be heated for varying times and to varying temperatures (using a combination of temperature and time to achieve the desired effect) such that the clay is selectively and suitably dehydrated.

This dehydration step is believed to be beneficial because at various stages of hydration there may still be significant exchange (the magnitude of which may be controlled) of lanthanum (for instance) into solution. The release of lanthanum may also be modified either singly or in combination by changes in the physico-chemical conditions of the solution such as pH and/or ionic strength. This lanthanum, once released into solution, may then be available to bind phosphorous in the water mass, leaving remaining lanthanum in the clay to bind phosphorus from sediment or other sources. This form of the invention assists in binding phosphorous in both the water mass and the sediment, as the material settles down into the water to form the reactive capping.

This dehydration step may additionally be beneficial because at sufficiently high temperatures (ca.>900–1000 deg C.) the clay structures may decompose to form a variety of other mineral phases. These degradation products may also be useful but are yet to be evaluated.

Alternatively the sediment remediation material may be pelletised and the pellets injected, placed upon the bottom by mechanical or other means (e.g. settling through the water column), or otherwise mixed with the bottom sediments. In one such application, it is expected that the element may be substantially immobilised within the expandable clay by driving off any water of hydration.

Alternatively, the physical form of the sediment remediation material may be modified, such as by pelletisation, to not only modify the movement of the material under a range of hydrodynamic scenarios but also to influence the release rate and/or availability of lanthanum (for instance) due to changes in the surface area of the pellets.

In can thus be seen that in the preferred form of the invention, the lanthanum doped, cation-exchanged, or modified clay or other mineral substrate has the potential to be used in a variety of natural aquatic environments (for example—lake, river, estuarine), or artificial aquatic environments (for example farm dam, aquaculture and treated/untreated industrial and/or sewage effluent), to reduce the concentration of dissolved phosphorus and in turn algal growth and/or biomass and/or bacterial growth and/or biomass and/or biological oxygen demand (BOD). The sediment remediation material may also be used to adsorb/bind/complex a range of other anions/oxyanions in aquatic systems.

Extensive laboratory trials have been undertaken to evaluate a wide range of lanthanum doped, cation-exchanged, or modified materials under a wide range of physico-chemical conditions. Preliminary results suggest that a lanthanum modified saponite or a lanthanum modified bentonite (both commercially sourced expandable clays) are the most promising materials. These materials have been demonstrated in trials to reduce dissolved phosphorous concentrations by in excess of 90% under a range of salinities in small scale batch tests. Application of these materials to sediment cores obtained from the Swan River in Western Australian demonstrated a similar phosphorous reduction capacity relative to untreated sediment cores over a period of seven days.

DETAILED DESCRIPTION OF THE INVENTION

A particular preferred example of the method and material therefor will now be described.

Sediment remediation materials for laboratory evaluation purposes were generally prepared in batches of 1 g to 5 g. Although the modified clay was only prepared on a laboratory scale, the simple cation-exchange technique may easily be scaled-up to produce large quantities.

Generally the procedure involves the mixing of a solution of 0.1M $LaCl_3$ with high purity bentonite (e.g. Commercial Minerals CE150 —ca. 90% bentonite), in the ratio 100:1 solution: solid ratio ( so that a large excess of La was available for ion-exchange), in an acid-washed plastic container. For laboratory scale production, the $LaCl_3$ solution and bentonite were mixed on a bottle roller for approximately 24 hours, although it will be understood that the mixing apparatus, solid/solution ratios and/or solute concentration and physico-chemical conditions may be varied to take into account requirements for scaling up.

On completion of the mixing, the product is centrifuged (10,000 rpm, 10 minutes) and the supernatant liquid decanted. A second eliquot of 0.1M $LaCl_3$ was added in the same solution: solid ratio and the mixing (ion-exchange) process repeated. The cation- exchanged sediment remediation material is then washed with distilled water and centrifuged. This process if repeated a minimum of three times to ensure removal of excess, unexchanged La. The washed cation-exchanged samples are then dried overnight in an oven at ca. 60° C. and stored under airtight conditions for later use.

In addition to the evaluation of clays substituted with lanthanide elements (principally lanthanum), a number of other clay derivatives are currently being prepared and evaluated. These clays include Zr-exchanged clays, pillared clays (using a variety of ions—Zr, La etc.) and clays using mixed ions (e.g. Zr and La). $ZrOCl_2$ has been used to successfully produce remediation materials with bentonite and saponite, in the same manner as set out in the first example. A mixed ion exchanged clay remediation material has been produced using a mixture of $ZrOCl_2$ and $LaCl_3$.

While bentonite has been used in this embodiment, many other types of clay are suitable but vary in their capacity to exchange La (or Zr) and hence their capacity to remove phosphorus.

The sediment remediation material produced as above may be applied by direct application to a waterbody, being spread in dry form as a powder or made up as a slurry, to the surface of a waterbody. Alternatively, the sediment remediation material may be pelletised and applied in a similar fashion. The former will result in a capping layer being produced which will overlie bottom sediment in the waterbody, subject to factors such as turbulence. The latter may be advantageous where it might be expected that environmental conditions might result in dispersal of finely divided sediment remediation material.

Pellets may be formed by binding the modified substrate. A variety of binders may potentially be used singly or in combination to manufacture a robust pellet which is resistant to dissolution and/or abrasion or has a controlled rate of decomposition. Binders that may be suitable include: Keggin (polyaluminuim) ions, starch, sodium silicate, portland cement (or combinations thereof). Calcination may also potentially be used to improve the properties of the pellets after the addition of the binder(s). The actual formation of the pellets may be achieved through a variety of processes (e.g. extrusion through dies or templates as a paste or viscous solid or rolling in mills or similar).

The sediment remediation material may also be directly applied to bottom sediments, directly at the sediment/water interface, or at various levels within the water column.

The sediment remediation material may also be applied in combination with solid or dissolved salts of lanthanum (for instance). This would allow a more rapid reduction of the free ion concentration of the (target) oxyanion(s) or anion(s) of interest followed by a more sustained reduction of the (target) oxyanion(s) or anion(s) of interest by the sediment remediation material. Additionally, the solid or disolved salts may include, or include in addition to group IIIB or IVB salts, a divalent or trivalent salt in addition, a suitable divalent salts being a calcium salt such as calcium nitrate, calcium chloride, or a mixture thereof. The effect of such salts is to form a liquid of the required density which will contain both dissolved lanthanum (for example) and the powdered sediment remediation material and deliver it to the desired depth within an aquatic system (e.g. sediment/water interface) and assist in preventing the resuspension of both the dissolved and solid sediment remediation agents. Hence, the material may be delivered to a depth in an aquatic system where it may have its desired optimal effect.

The sediment remediation material may be contained within semipermiable geotextiles, such as coarse weave PVC material, to allow flow of solute therethrough. The geotextiles with contained sediment remediation material may be suspended within a waterbody or placed on the bottom or sides of the waterbody, possibly in direct contact with the underlying sediment.

Any of the above arrangements may be utilised in an artificial/constructed or natural wetland, or a treatment pond, lake, reservoir etc.

In the following example, a La exchanged saponite sediment remediation material was trialled with bottom sediments and river water. This remediation material was produced using the same method as described for the La exchanged bentonite sediment remediation material. The trials were conducted in the laboratory over 96 hours using 1.0 g of Swan River (Maylands, Western Australia) sediment and 0.1 g of modified clay or 30 mL of sample water and 0.1 g of modified clay (Ellen Brook, Avon River and Swan River, Western Australia), in the trials the sediment remediation material was mixed with the sample. The trials demonstrated that the sediment remediation material may efficiently remove phosphate from a variety of natural waters and wastewaters. A summary of the results of the trial is presented in the following table, which shows the reduction in dissolved phosphorus concentrations (as $PO_4$–P) released from the Swan River (Maylands, Western Australia) from bottom sediment over a range of salinities, and from Ellen Brook, Avon River, and Swan River waters (Western Australia) after the addition of La-saponite sediment remediation material.

| Sample type (salinity) | $PO_4$—P ($\mu$g/L) in solution- no treatment | $PO_4$—P ($\mu$g/L) - modified clay treatment |
|---|---|---|
| Maylands sediment (0) | 120 | <5 |
| Maylands sediment (5) | 120 | <5 |
| Maylands sediment (30) | 130 | <5 |
| Ellen Brook water (0) | 450 | 9 |
| Avon River water (4) | 20 | <5 |
| Swan River water (25) | 35 | <5 |

A number of sewage effluents have also been tested. Samples of final effluent were collected from two sewage treatment plants (Denmark, Western Australia and Subiaco, Western Australia) and combined with La-exchanged bentonite sediment remediation material in the ratio 0.1 g La-bentonite/30 mL effluent and mixed for 24 hours. The results, which suggest that the sediment remediation material is able to remove dissolved phosphate from sewage effluent, are summarized in the following table:

| Sample type (salinity) | $PO_4$—P (mg/L) final effluent- no treatment | $PO_4$—P (mg/L) - modified clay treatment |
|---|---|---|
| Denmark | 3.49 ± 0.23 | 0.0025 ± 0.00 |
| Subiaco | 1.13 ± 0.04 | 0.0025 ± 0.00 |

Laboratory trials suggest that the two La-cation exchanged clays referred to above are able to reduce dissolved phosphorus concentrations present as either dissolved phosphate (in a range of natural waters) or released from bottom sediments by in excess of 90% under a range of salinities in small scale batch tests. The trials suggests that the two sediment remediation materials bind phosphorus rapidly and strongly. It is believed that the La-exchanged clay-P complexes formed in the sediment remediation materials are robust under a variety of environmental conditions commonly encountered in aquatic environments such as in the Swan-Canning River system. Specifically, the effectiveness of the modified clays in binding dissolved phosphorus appear to be:

unaffected by a range of salinities (0–35 parts per thousand), unaffected by redox status (oxidising or reducing conditions) or dissolved oxygen levels (ie. anoxia to oversaturation)

able to bind phosphorus over a wide operational pH range (ca. 6–10 and probably ca. 5–11)

and believed to be unaffected by microbial action in the short-term.

Application of a sediment remediation material to sediment cores from the Swan River has also demonstrated a similar phosphorus reduction capacity to that demonstrated in in-vitro testing relative to untreated sediment cores over a period of seven days. Immediately after the application of the sediment remediation material as a capping over the core, there was a rapid decline in $PO_4$–P in solution to below detection limits which was sustained for approximately 150 hours. The robustness of the sediment remediation material in binding phosphorus was highlighted during the last stage of the experiment where induced anoxia did not result in the release of phosphorus bound to the modified clay in the experimental cores. Similar capacities to reduce phosphorus concentrations in waters overlying sediment cores due to the application of sediment remediation materials have also been demonstrated for Lake Monger (Perth, Western Australia) and the Canning River (Perth, Western Australia), the latter having phosphorus release suppressed for in excess of 400 hours.

There are a number of advantages of using the modified clay as a remediation material, over and above simple delivery of aqueous solutions of reactive compounds. The sediment remediation material was developed using a clay as the clay is a simple substrate to deliver the La (or other elements) in a solid form to the sediment-water interface, allow settling through the water column and allow bound oxyanions to be recovered in a solid form. As the clay is a natural material is likely to be harmonious with the environment to which it is introduced as the sediments of many aquatic systems are dominated by clays or have clay as a significant component.

It should be appreciated that the scope of the invention is not limited to the particular examples or applications described herein.

What is claimed is:

1. A method for remediating matter selected from sediments and effluent by removing phosphorus and oxyanion pollutants therefrom, the method including the step of contacting the matter with a substrate selected from one or more of an aluminosilicate clay and an aluminosilicate having a three dimensional framework structure with internal cavities, modified by cation exchange with an effective amount of complexing element(s) selected from Group IIIB, lanthanides, and Group IVB elements to remove said phosphorus and oxyanion pollutants.

2. A method as claimed in claim 1 wherein the substrate is selected from one or more of an expandable clay and a fibrous, chain like related clay mineral.

3. A method as claimed in claim 1 wherein said substrate is selected from one or more of saponite, bentonite, vermiculite, attapulgite, sepiolite or palygorskite.

4. A method as claimed in claim 1 wherein the substrate includes zeolite.

5. A method as claimed in claim 1 wherein the substrate is pre-treated with a concentrated acid to remove a large proportion of the interlayer cations before being modified with said complexing element.

6. A method as claimed in claim 1 wherein the complexing element is selected from one of more of lanthanum, cerium, praseodymium, neodymium, promethium, samarium, europium, gadolinium, terbium, dysprosium, holmium, erbium, thulium, yttrium, ytterbium, lutetium, zirconium, and hafnium.

7. A method as claimed in claim 6 wherein the complexing element comprises lanthanum.

8. A method as claimed in claim 6 wherein the complexing element comprises zirconium.

9. A method as claimed in claim 6 wherein the complexing element comprises a mixture of lanthanum and zirconium.

10. A method as claimed in claim 1 wherein the modified substrate is altered by the addition of at least one of organic and inorganic ligands to alter its chemical properties for a particular application.

11. A method as claimed in claim 1 wherein the modified substrate is applied as a dry powder, as pellets, or as a wet slurry to the surface of a waterbody.

12. A method as claimed in claim 1 wherein the modified substrate is applied directly to a surface of bottom sediments of a waterbody.

13. A method as claimed in claim 1 wherein the modified substrate is injected into bottom sediments of a waterbody.

14. A method as claimed in claim 1 wherein the modified substrate forms a capping layer over the surface of bottom sediments of the water body.

15. A method as claimed in claim 14 wherein the capping layer has a thickness between 0.5 mm and 5 mm.

16. A method as claimed in claim 1 wherein the modified substrate is sandwiched between geotextiles selected from water permeable membranes, woven plastic cloth, woven PVC cloth, and woven PVC textile.

17. A method as claimed in claim 1 wherein the modified substrate is pelletised and sandwiched between woven net surfaces having apertures smaller than the pellets in order to accommodate a high solute flow while retaining the remediation material therein.

18. A method for remediating matter selected from sediments and effluent by removing phosphorus and oxyanion pollutants therefrom, the method including the step of contacting the matter with a substrate selected from one or more of an aluminosilicate clay and an aluminosilicate having a three dimensional framework structure with internal cavities, modified by cation exchange with an effective amount of at least one complexing element selected from Group IIIB, lanthanides, and Group IVB elements, and including adding a soluble salt of the complexing element selected from group IIIB and Group IVB elements to remove said phosphorus and oxyanion pollutants.

19. A method as claimed in claim 18 wherein the salt is a chloride salt, a nitrate salt or a mixture of chloride and nitrate salts of the complexing element.

20. A method as claimed in claim 19 further including the addition of a divalent salt, a calcium salt, or a trivalent salt.

21. A method for remediating matter selected from sediments and effluent by removing phosphorus and oxyanion pollutants therefrom, the method including the step of contacting the matter with a substrate selected from one or more of an aluminosilicate clay and an aluminosilicate having a three dimensional framework structure with internal cavities, modified by cation exchange with an effective amount of at least one complexing element selected from Group IIIB, lanthanides, and Group IVB elements, to remove said phosphorus and oxyanion pollutants, and wherein the substrate has a cation exchange capacity (CEC) of greater than about 30 milliequivalents per 100 grams (Meq/100 g).

22. A method as claimed in claim 21 wherein the substrate has a cation exchange capacity (CEC) of greater than about 100 meq/100 g.

23. A method as claimed in claim 22 wherein the substrate has a cation exchange capacity (CEC) of greater than about 150 meq/100 g.

* * * * *